United States Patent
Gülfirat et al.

(10) Patent No.: US 11,187,673 B2
(45) Date of Patent: Nov. 30, 2021

(54) DEVICE AND METHOD FOR VERIFICATION, CALIBRATION AND/OR ADJUSTMENT OF AN INLINE MEASURING DEVICE

(71) Applicant: Endress+Hauser Conducta GmbH+Co. KG, Gerlingen (DE)

(72) Inventors: Tuncay Gülfirat, Esslingen (DE); Kazuhiko Yamamoto, Tokyo (JP); Martin Freudenberger, Schwaikheim (DE); Bo Ottersten, Regensburg (DE); Martin Lohmann, Gerlingen (DE); Oliver Durm, Benningen am Neckar (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 345 days.

(21) Appl. No.: 16/391,923

(22) Filed: Apr. 23, 2019

(65) Prior Publication Data
US 2019/0323989 A1   Oct. 24, 2019

(30) Foreign Application Priority Data
Apr. 23, 2018   (DE) .................... 10 2018 109 696.8

(51) Int. Cl.
*G01N 27/416* (2006.01)
*H04W 4/029* (2018.01)
(Continued)

(52) U.S. Cl.
CPC ....... *G01N 27/4165* (2013.01); *G01N 27/302* (2013.01); *H04W 4/029* (2018.02); *H04W 4/38* (2018.02)

(58) Field of Classification Search
CPC . G01N 27/4165; G01N 27/302; H04W 4/029; H04W 4/38; G01D 21/00; G01D 18/008
See application file for complete search history.

(56) References Cited

U.S. PATENT DOCUMENTS

| | | | | |
|---|---|---|---|---|
| 7,187,455 B2* | 3/2007 | Curtis | ................... | G01F 23/292 356/627 |
| 2014/0012530 A1* | 1/2014 | Reinhold | ........... | G01N 27/4165 702/104 |
| 2015/0027887 A1* | 1/2015 | Lee | .................... | G01N 27/3335 204/406 |

FOREIGN PATENT DOCUMENTS

| | | |
|---|---|---|
| CN | 103245703 A | 8/2013 |
| CN | 104375473 A | 2/2015 |

(Continued)

*Primary Examiner* — James J Yang
(74) *Attorney, Agent, or Firm* — Mark A. Logan; Endress+Hauser (USA) Holding Inc.

(57) ABSTRACT

The present disclosure relates to an apparatus the for verification, calibration, and/or adjustment of a measuring instrument. The apparatus includes the measuring instrument, a reference measuring instrument, and a smart device. The apparatus performs a measuring operation in which the measuring instrument determines a value of a variable of the medium and the reference instrument determines a reference value of the variable from a sample of the medium. The measuring instrument communicates wirelessly and performs the verification, calibration, and/or adjustment on the basis of the measured value and the associated reference value. The reference measuring instrument is portable and communicates wirelessly with the smart device and the measuring instrument. An application executed on the smart device controls a data transfer between the measuring instrument, the reference measuring device, and/or the device that is required for executing the verification, calibration, and/or adjustment.

16 Claims, 2 Drawing Sheets

(51) Int. Cl.
*H04W 4/38* (2018.01)
*G01N 27/30* (2006.01)

(56) References Cited

FOREIGN PATENT DOCUMENTS

| | | |
|---|---|---|
| CN | 104679915 A | 6/2015 |
| CN | 106352910 A | 1/2017 |
| CN | 107003160 A | 8/2017 |
| CN | 107085117 A | 8/2017 |
| DE | 102010030488 A1 | 12/2011 |
| DE | 102016117733 A1 | 4/2017 |

* cited by examiner

DEVICE AND METHOD FOR VERIFICATION, CALIBRATION AND/OR ADJUSTMENT OF AN INLINE MEASURING DEVICE

CROSS-REFERENCE TO RELATED APPLICATION

The present application is related to and claims the priority benefit of German Patent Application No. 10 2018 109 696.8, filed on Apr. 23, 2018, the entire contents of which are incorporated herein by reference.

TECHNICAL FIELD

The present disclosure relates to an apparatus and method for verification, calibration and/or adjustment of a measuring instrument taking the form of an in-line measuring instrument for measuring a measurement variable of a medium present at a measuring point at a place of use, which comprises the measuring instrument installed at the measuring point and a reference measuring instrument for measuring the measurement variable of at least one sample of the medium taken at the measuring point, and is configured in such a way that, by means of the apparatus at least one measuring operation can be carried out, wherein the measuring instrument determines a measured value of the measurement variable of the medium and the reference measuring instrument determines a reference value of the measurement variable of a sample taken at the measuring point, and a method for verifying, calibrating and/or adjusting the measuring instrument that is executable by means of said apparatus.

BACKGROUND

Measuring instruments known from the prior art comprise measuring instruments designed as an in-line measuring instrument which include a measuring device that is in contact with the medium during the measuring operation, and measuring instruments which determine the measurement variable based on a sample of the medium taken at the measuring point.

In-line measuring instruments, such as in-line measuring instruments equipped with, for example, an amperometric, potentiometric, photometric or spectrometric measuring device, are used, for example, in process analysis technology, where they are used, for example, for measuring a pH value of the medium or for measuring a concentration of an analyte contained in the medium. Depending on the type of measuring device, in-line measuring instruments may, under certain circumstances, have a cross-sensitivity to other parameters and/or disturbance variables present in the medium, so that they have a lower measuring accuracy than measuring instruments which determine the same measurement variable by analyzing a sample taken at the measuring point.

In particular in the case of in-line measuring instruments, there is frequently the problem that their measuring properties can change over time, for example, due to aging processes. In the long term, this leads to a reduction in the achievable measurement accuracy.

In order to still ensure as high a measuring accuracy as possible over an extended period, in-line measuring instruments are repeatedly verified and/or calibrated, and adjusted if necessary, in a way that is usual today.

As a verification, a method is described herein in which the measurement variable is checked on the basis of at least one measured value determined with the measuring instrument and one otherwise determined reference value of the measurement variable to ascertain whether the measured value(s) agree(s) with the associated reference values within a predetermined error tolerance.

In the present case, a method is described as calibration wherein at least one compensating value is determined on the basis of at least one measured value determined with the measuring instrument and an otherwise determined reference value of the measurement variable, and on the basis of which at least one calibration value stored in the measuring instrument can be checked and, if necessary, also adjusted.

Calibration values are data that reflect a dependence of the quantity measured by the measuring instrument on the value of the measurement variable. Said data are used by the measuring instrument to determine on the basis of the measured quantity an associated measured value corresponding to the value of the measured measurement variable. Calibration values can be stored in the measuring instrument, for example, in the form of raw data determined in a calibration process and/or in the form of data derived from these raw data. For example, the raw data can be used to determine a calibration function representing the dependence of the measured quantity on the value of the measurement variable, the coefficients of which are then stored in the measuring instrument as calibration values derived from the raw data. In this case for a measuring instrument having a substantially linear dependency of the measured quantity on the value of the measurement variable, a calibration line, for example, can be determined that is established by two coefficients, namely its zero point and its slope.

An adaptation of at least one calibration value stored in the measuring instrument and carried out on the basis of at least one comparison value is what in the present case is understood as adjustment.

In principle, it is desirable to be able to operate in-line measuring instruments as free of interruptions as possible. In addition there are applications, in which in-line measuring instruments should not be removed from the measuring point for reasons of hygiene and/or sterility. This is the case, for example, with in-line measuring instruments used in biotechnological systems. Accordingly, there is a need to perform the verification, calibration and, if necessary, also the adjustment of in-line measuring instruments without removing the measuring instrument from the measuring point.

For this purpose, for example, an apparatus described in the applicants' German patent application DE 10 2016 117 733 A1 can be used for verifying, calibrating and/or adjusting a measuring instrument designed as an in-line measuring instrument for measuring a measurement variable of a medium present at a measuring point at a place of use, which comprises the measuring instrument installed at the measuring point and a reference measuring instrument for measuring the measurement variable of at least one sample of the medium taken at the measuring point, and which is designed in such a way that at least one measuring operation—in which the measuring instrument determines a measured value of the measurement variable of the medium and the reference measuring instrument determines a reference value of the measurement variable of a sample taken at the measuring point—is executable by means of the apparatus.

In this apparatus, the measuring instrument and the reference measuring instrument are continuously operated in parallel at the location of use. Measured values of the measurement variable of the medium are here determined continuously with the measuring instrument. Connected upstream of the reference measuring instrument is a sampling device, which extracts samples of the medium at the measuring point and supplies them to the reference measuring instrument, which then determines reference values for the measurement variable of the samples on the basis of the samples. The apparatus described herein also includes an electronic control device, which receives the measured values and the reference values and on the basis of the measured values and the reference values carries out a verification, calibration and/or adjustment of the in-line measuring instrument.

This apparatus offers the advantage that measurement values having a very high measuring rate are available via the in-line measuring instrument, the measurement accuracy of which can be kept at a comparatively high level via the verification, calibration and/or adjustment of the in-line measuring instrument carried out by the control device using the reference values available by means of the reference measuring instrument having higher measuring accuracy but due to the sampling having only a lower measuring rate.

However, it is disadvantageous that at each measuring point at which the apparatus is used, the measuring instrument, the reference measuring instrument and the control device connected to the two devices are in each case permanently required, and that, in addition to the in-line measuring instrument, the reference measuring instrument must of course also be regularly serviced and be verified, calibrated and/or adjusted at regular intervals.

This problem can be addressed at least in part by a method applicable in process analysis technology for compensation of a measuring instrument installed at a measuring point, which method is described in the applicants' DE 10 2010 030 488 A1. In this compensation method, certain measured values of the measurement variable are recorded by the measuring instrument at specific points in time. In parallel with this, a sample of the medium is taken at each of these instants and then sent to a laboratory, where reference measurements on the sample are carried out by means of a reference measuring instrument arranged in the laboratory. The measured values and the reference values are then transmitted to a data acquisition and processing device, which then determines at least one adjustment factor which is then transmitted to the measuring instrument. The data acquisition and processing device is preferably integrated in the reference measuring instrument, which is connected to the measuring instrument via a communication line. Alternatively, however, it may also be a component of a personal computer or be a process control computer that communicates with the measuring instrument e.g. via radio, via the internet or via a data bus.

However, this form of calibration and adjustment is comparatively time-consuming and cost-intensive due to the need for transportation of samples, wherein expenditure increases with the number of samples required and the distance from the laboratory. In addition, a certain level of identification and logistics is required in order to ensure that samples are not inadvertently assigned to the wrong measuring points and to ensure that the measured values can be correctly assigned to the associated reference values. Furthermore, the measurement variable of the sample can, in particular, change with a longer transport duration, with a longer storage time and/or with ambient influences acting thereon, which as a result leads to a correspondingly faulty calibration and adjustment of the measuring instrument.

SUMMARY

It is an object of the present disclosure to specify an apparatus and a method executable therewith that enables a fast and economical verification, calibration and/or adjustment of a measuring instrument installed at a measuring point that are as error-free as possible and without the measuring instrument having to be removed from the measuring point.

For this purpose, the present disclosure comprises an apparatus for the verification, calibration and/or adjustment of a measuring instrument taking the form of an in-line measuring instrument for measuring a measurement variable of a medium present at a measuring point at a location of use, which comprises the measuring instrument installed at the measuring point and a reference measuring instrument for measuring the measured value of at least one sample of the medium taken at the measuring point, and is configured in such a way that, by means of the apparatus at least one measuring operation can be carried out, wherein the measuring instrument determines a measured value of the measurement variable of the medium and the reference measuring instrument determines a reference value of the measurement variable of a sample taken at the measuring point, characterized in that the measuring instrument is designed to communicate wirelessly and, with the aid of the measured value and measurement results of at least one measuring operation comprising the associated reference, to carry out a verification, calibration and/or adjustment of the measuring instrument, the reference measuring instrument is designed as a portable, wirelessly communicating reference measuring instrument that can be temporarily used for the purpose of verification, calibration and/or adjustment of the measuring instrument at the location of use, and the apparatus comprises a smart device that is temporarily usable for the purpose of verification, calibration and/or adjustment of the measuring instrument at the location of use, is integrated in the reference measuring instrument, communicates wirelessly via the reference measuring instrument or is formed by a wirelessly communicating smart mobile device, and an application that is executable by means of the device is installed on the device, which application is configured to regulate a data transfer between the measuring instrument, the reference measurement instrument and/or the device that is required for executing at least one verification, calibration and/or adjustment method by means of the apparatus according to a method sequence stored in the device and to document the execution of the method sequence and/or a verification, calibration and/or adjustment result determined by the measuring instrument within the context of the execution.

This apparatus, as well as the method which is executable therewith, offers the advantage that the verification, calibration and/or adjustment of measuring instruments can be carried out without the measuring instrument in question having to be removed from the measuring point for this purpose. A further advantage is that the user is at the same time provided, via the documentation carried out by means of the smart device, with a proof of the respectively executed method, with the aid of which the user can, for example, document a regularly performed verification, calibration and/or adjustment of the measuring instrument in question. A further advantage is that the reference value or the reference measured values are determined immediately after the sample is taken at the location of use. Due to the temporal and spatial proximity secured thereby, the influences that may be altering the measurement variable of the sample are drastically reduced. Moreover, there is a direct assignment of the measured values to the associated reference values via the spatial proximity of the reference measuring instrument to the measuring instrument and the data transfer regulated according to the respective method sequence. Thus, neither special identification of the samples nor any corresponding logistics are required in order to prevent incorrect associations and/or mix-ups with the samples.

A further advantage is that the reference measuring instrument and the smart device can be reused in succession at a plurality of locations as a component of the apparatus according to the present disclosure which is used there. Thus a verification, calibration and/or adjustment of a plurality of measuring instruments arranged at different measuring points can be executed successively at substantially lower cost than would be the case if at all such measuring points the two measuring instruments described in DE 10 2016 117 733 A1 had to be continuously operated in parallel to each other for measuring the same measurement variable.

A first development of the present disclosure is characterized in that
the mobile device is a smart phone or tablet,
the measuring instrument, the reference measuring instrument and/or the mobile device is configured to communicate wirelessly via a local network, via a global network, via a mobile radio network and/or via Bluetooth,
the measuring instrument has a communication device which is connected thereto or is designed as a component of the measuring instrument and is designed in such a way that it supports at least one form of wireless communication that is also supported by the reference measuring instrument and/or by the mobile device, and/or
the reference measuring instrument has a communication device which is connected thereto or is designed as a component of the reference measuring instrument and is designed in such a way that it supports at least one form of wireless communication which is also supported by the measuring instrument and/or the mobile device.

A second development is characterized in that
the required data transfer for each measuring operation that is to be carried out and/or has been completed according to at least one method sequence in each case comprises the transmission of the reference value determined by the reference measuring instrument to the measuring instrument, or additionally comprises further data to be transmitted,
wherein the further data comprise data to be documented by means of the smart device and/or requests, queries, transmission prompts and/or information required for at least one method flow for the coordination of a method that is executable according to the respective method sequence by means of the device.

A third development of the present disclosure is characterized in that
the application is designed to call up and/or document information relating to the user of the apparatus, to the location of use, to the measuring point, to the method sequence to be executed and/or comprehensive data relating to the verification, calibration and/or adjustment to be carried out by means of the apparatus, to the measuring instrument, and/or to the reference measuring instrument,
the measuring instrument is designed to provide—automatically or on request initiated by the application or the user—the smart device with data stored in the measuring instrument regarding its measuring instrument identifier, its measuring instrument type, its age, its operating time and/or a measuring point description of the measuring point, and/or
the reference measuring instrument is designed to provide—automatically or on request initiated by the application or the user—the smart device with data stored in the measuring instrument regarding its measuring instrument identifier, its measuring instrument type, its measuring accuracy, a point in time of a last executed verification, calibration and/or adjustment of the reference measuring instrument, its age and/or its operating time.

A fourth development of the present disclosure is characterized in that the smart device is designed to determine at least one additional information item and/or is designed to use and/or to document data provided by the user, by the measuring instrument and/or by the reference measuring instrument and/or the additional information and for selecting and/or for carrying out at least one method sequence stored in the smart device.

A fifth development is characterized in that the smart device is designed to determine its geographic position at the location of use as an additional variable and to use and/or document this for the selection of a method sequence stored in the smart device and/or for the identification of the location of use and/or the measuring point.

A sixth development is characterized in that
the smart device is designed to determine a time of day, and
the application is configured:
a) to coordinate on the basis of the time of day at least one partial sequence of at least one method sequence that is executable with mediation by the application by means of the device,
b) to provide specific measurement results in several successive measuring operations, each having a time stamp based on the time of day, and/or
c) on the basis of the time of day, to document an execution point in time or time frame of at least one executed verification, calibration and/or adjustment.

A seventh development of the present disclosure is characterized in that
the measuring instrument comprises at least one sensor for measuring an additional variable of the medium and the reference measuring instrument comprises at least one sensor for measuring the additional variable of the sample in question,
the apparatus is configured in such a way that the additional variables of the medium and of the sample are detected in at least one measuring operation, in several measuring operations or in each measuring operation, and
the apparatus is configured in such a manner that
a) the additional variables are taken into account by the smart device when the method sequence is executed,
b) the additional variables from the measuring instrument are taken into account in the verification and/or calibration,
c) on the basis of the additional variables, a compensation of a measuring error, depending on the additional variable, of at least one measured value and/or at least one reference value is carried out and a correspondingly corrected value for verification, calibration and/or adjustment is used, and/or
d) the difference between the additional variables of at least one measuring operation is determined and d1) on the basis of this difference, an error to be expected in the execution of the verification, calibration and/or adjustment is estimated and output, displayed to the user and/or otherwise documented, d2) an error message is output if the difference exceeds a predetermined limit value, d3) the execution of at least one further measuring operation is triggered by the application when the difference exceeds a predetermined limit value, and the method is continued on the basis of the measurement results of the further measuring operations, and/or d4) on the basis of the difference between the two additional variables of at least one measuring operation, a correction of a difference calculated within the context of the verification, calibration and/or adjustment between the measured value and the associated reference value is determined.

An eighth development of the present disclosure is characterized in that the measuring instrument and the reference measuring instrument each comprise a sensor taking the form of a temperature sensor for measuring the additional variable, temperature.

A ninth development of the present disclosure is characterized in that the stored method sequences comprise at least one method sequence which includes at least a sub-sequence, the execution of which is linked to a condition to be fulfilled by a result of a sub-sequence preceding this sub-sequence, the stored method sequences comprise a method sequence, according to which a verification is carried out, followed only by a calibration or a calibration with subsequent adjustment should the verification lead to a negative verification result, and/or the stored method sequences comprise a method sequence according to which a check is made based on a verification and/or calibration performed by means of the apparatus as to whether an adjustment is required and the apparatus is designed to then execute a required adjustment only if and/or once the user actively agrees to execution via the smart device and/or the associated change of at least one calibration value to be effected by the adjustment exceeds a predetermined limit, and/or the apparatus is designed to carry out a required adjustment at a later point in time and/or at a point in time predeterminable by the user via the smart device.

A tenth development of the present disclosure is characterized in that the smart device is designed to acquire, and indicate to the user, data to be documented via the application for at least one verification, calibration and/or adjustment run executed by means of the apparatus, for several of such runs or for one in each case and/or to store the data in at least one database, namely in a local database provided in the smart device and/or via the internet in a central database or in a database created in a cloud with internet connectivity.

An eleventh development of the present disclosure is characterized in that the smart device is designed to acquire and display data to be documented via the application for at least one verification, calibration and/or adjustment run executed by means of the apparatus, for several such runs or for one in each case and/or to store the data in the local and/or central database, wherein the data to be documented and/or the data storable in the local and/or central database and/or stored data to be documented, in each case in particular comprise:

a) information relating to the user, to the location of use, to the measuring point, to the measuring point name and/or to the geographic position of the smart device at the location of use, b) measuring instrument identifier, measuring instrument type, age and/or operating time of the measuring instrument, c) measuring instrument identifier, measuring instrument type, age, operating time, measuring accuracy and/or the point in time of the last performed verification, calibration and/or adjustment of the reference measuring instrument, d) an execution point in time or time frame of the executed verification, calibration and/or adjustment, e) the number and/or the measurement results of the measuring operations carried out, f) the determined additional variables and/or an expected error derived therefrom in the verification, calibration and/or adjustment, and/or g) the verification result, the calibration result and/or the adjustment result, and/or are storable or stored in the local and/or central database in such a way, that individual data can be called up by the user in a targeted manner via the smart device.

The present disclosure further relates to a method for verifying, calibrating and/or adjusting the measuring instrument installed at the measuring point at the location of use and which is executable by means of an apparatus according to the present disclosure which is characterized in that the portable reference measuring instrument and the smart device configured as a mobile device or integrated in the reference measuring instrument is brought to the location of use and the application is started, at least one method sequence predetermined for the particular use of the apparatus or selected by the user by means of the application, wherein a) at least one measuring operation is carried out, wherein the measuring instrument determines the measured value, a sample is drawn at the measuring point, the reference measuring instrument determines the reference value of this sample and the reference value is transmitted to the measuring instrument, b) the measuring instrument performs the verification, calibration and/or adjustment of the measuring instrument to be carried out according to the method sequence on the basis of the measurement results, and c) the execution of the method sequence and/or a verification, calibration and/or adjustment result determined by the measuring instrument within the scope of the execution is documented by means of the smart device.

A development of this method is characterized in that a) data made available by the measuring instrument, by the reference measuring instrument and/or by the user are acquired and documented by the smart device by means of the application and/or are used for the selection of one of a plurality of method sequences stored in the smart device, b) the application offers the user a plurality of method sequences stored in the smart device for selection from which the user selects the method sequence(s) to be executed by means of the apparatus, c) the measuring point and/or the location of use of the apparatus is identified on the basis of a geographic position of the smart device determined by the smart device at the location of use, and/or d) during at least one measuring operation by means of the measuring instrument, the additional variable of the medium is determined and, by means of the reference measuring instrument, the additional variable of the sample is determined, and the additional variables are used, in that d1) based on the difference between them, an error to be expected in the execution of the verification, the calibration and/or the adjustment is estimated and output, displayed and/or documented to the user, and/or the execution of at least one further measuring operation is triggered if said difference exceeds a predetermined limit value, d2) on the basis of the additional variable determined by the measuring instrument, a compensation of a measurement error of the measured value determined in the measuring operation that depends on the additional variable is carried out and a correspondingly corrected measured value is used for the verification, calibration and/or adjustment, d3) on the basis of the additional variable determined by the reference measuring instrument, a compensation of a measurement error of the particular reference value determined in the respective measuring operation that depends on the additional variable is carried out and a correspondingly corrected reference value is used for the verification, calibration and/or adjustment, and/or d4) on the basis of their difference, a correction of a difference between the measured value and the associated reference value of the measuring operation determined in the context of the verification and/or the calibration is determined.

A further development of the method is characterized in that the smart device and/or the reference measuring instrument is/are used in at least one further location of use as a component of an apparatus according to the present disclosure used there for executing a method according to the present disclosure, and data acquired in this process by means of the smart device that are to be documented are displayed and/or stored in the local and/or central database.

The present disclosure and its advantages will now be explained in detail using the figures in the drawing which show two exemplary embodiments.

DETAILED DESCRIPTION

Figure 1:
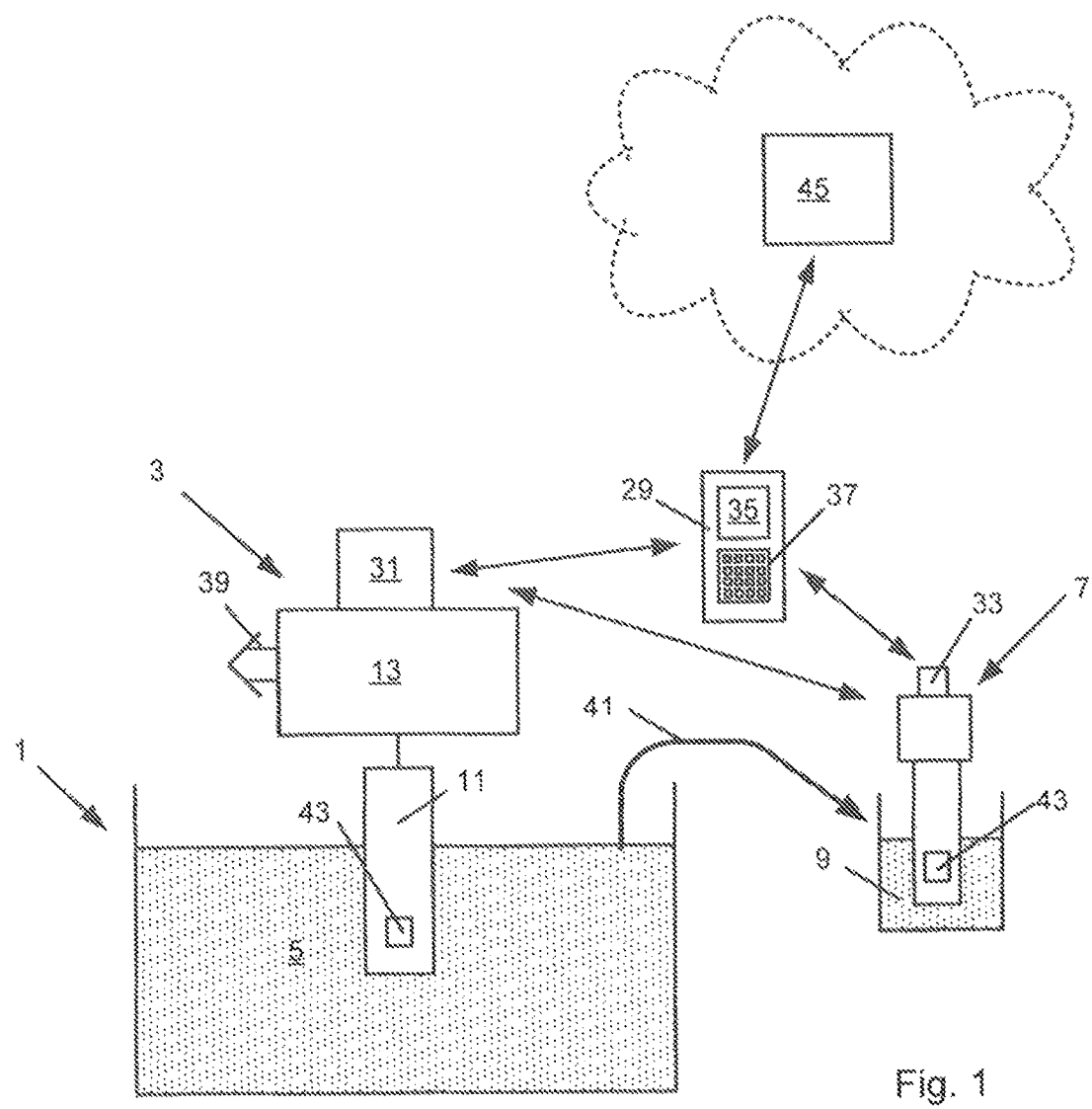
FIG. 1 shows an apparatus according to the present disclosure having a smart device in the form of a mobile device.

The present disclosure relates to an apparatus and a method for verification, calibration and/or adjustment, by means of the apparatus, of a measuring instrument 3 installed at a measuring point 1 at a location of use and taking the form of an in-line measuring instrument for measuring a measurement variable of a medium 5 present at the measuring point 1. FIG. 1 shows an example of an apparatus according to the present disclosure. The apparatus comprises the measuring instrument 3 installed at the measuring point 1 and a reference measuring instrument 7 for measuring the measurement variable of at least one sample 9 of the medium 5 taken at the measuring point 1. The apparatus is designed in such a manner that, by means of the apparatus at the location of use, at least one measuring operation can be performed in which the measuring instrument 3 determines a measured value of the measurement variable of the medium 5 and the reference measuring instrument 7 determines a reference value of the measurement variable of a sample 9 taken at the measuring point 1. A reference measuring instrument 7 which has a greater measuring accuracy than the measuring instrument 3 installed at the measuring point 1 is particularly suitable as the reference measuring instrument 7.

Figure 2:
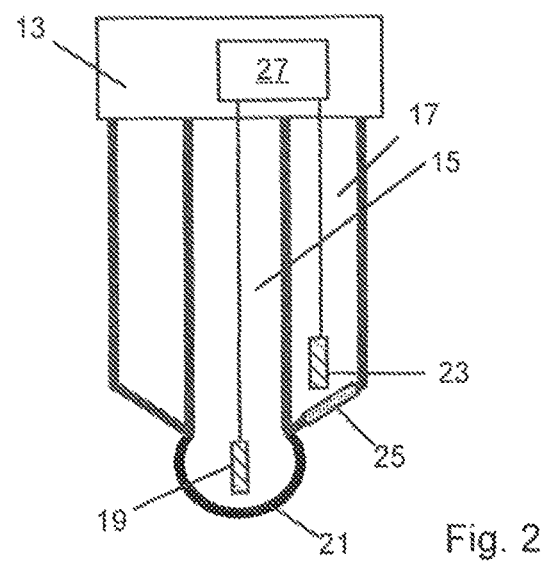
FIG. 2 shows an example of a measuring device of the apparatus shown in FIG. 1.

The measuring instrument 3 can comprise, for example, a measuring device 11, such as a sensor, for the metrological acquisition of a quantity depending on the measurement variable, and an electronics unit 13, such as a measuring transducer, which is connected to the measuring device 11. As an example of such a measuring device 11, FIG. 2 shows a potentiometric pH sensor comprising a measuring cell 15 and a reference cell 17. The measuring cell 15 comprises a pH electrode 19 arranged in a buffer solution and an outwardly terminating pH-sensitive membrane 21, such as an H3O+-ion-selective glass membrane, which detects the measuring cell 15. When the sensor is immersed in the medium 5, a measurement potential dependent on the ion activity of the H3O+ ions, and thus on the pH value of the medium 5, is formed at the ion-selective membrane 21 and can be picked up via the pH electrode 19. The reference cell 17 comprises a reference electrode 23 arranged in an electrolyte, and a diaphragm 25 which outwardly terminates the reference cell 17 and is permeable to charge carriers. When the sensor is immersed in the medium, the charge exchange through the diaphragm 25 causes the reference electrode 23 to be at a reference potential corresponding to the potential of the medium 5. The pH electrode 19 and the reference electrode 23 are connected to a measuring circuit 27 which, on the basis of the measuring potential derived via the pH electrode 19 and the reference potential derived via the reference electrode 23, generates an output signal dependent on the pH.

However, the present disclosure is not restricted to pH measuring instruments, but can also be used completely analogously in conjunction with in-line measuring instruments to measure another measurement variable. Examples of these are in-line measuring instruments, such as an amperometric, a potentiometric or a spectrometric measuring device comprising measuring instruments, as are used, for example, to measure a concentration of an analyte in a medium.

According to the present disclosure, the measuring instrument 3 is designed to communicate wirelessly and to verify, calibrate and/or adjust the measuring instrument 3 on the basis of the measurement results of at least one measuring operation carried out by means of the apparatus.

During the verification, the measuring instrument 3 determines a verification result on the basis of the measurement results, which verification result specifies whether or not the measured values of the executed measuring operations in each case correspond to the associated reference value within a predetermined fault tolerance. Alternatively or additionally thereto, the verification result may contain a statement as to whether the verification was carried out successfully or not.

In the calibration, the measuring instrument 3 determines a calibration result on the basis of the measurement results, said calibration result comprising at least one compensation value by means of which at least one calibration value stored in the measuring instrument 3 can be checked and adjusted if necessary. Alternatively or additionally thereto, the calibration result may contain a statement as to whether the calibration had been carried out successfully or not. An example of a calibration that can be carried out by means of the apparatus is a 1-point calibration, in which a calibration value is determined on the basis of the measurement results of at least one measuring operation, on the basis of which a zero point of a calibration function stored in the measuring instrument 3 can be checked and on the basis of which an adjustment of the zero point can be undertaken if necessary.

In the adjustment, the measuring instrument 3, on the basis of the compensation value(s) determined by the calibration, executes a corresponding adaptation of at least one calibration value stored in the measuring instrument 3. Optionally, the measuring instrument 3 can be configured to provide an adjustment result corresponding to the adjustment that was carried out. The adjustment result may, for example, contain one or more calibration values adapted by the adjustment and/or it may contain a statement as to whether the adjustment had been carried out successfully or not.

According to the present disclosure, the reference measuring instrument 7 is designed as a portable, wirelessly communicating reference measuring instrument 7 that is temporarily usable at the location of use for the purpose of verification, calibration and/or adjustment of the measuring instrument 1.

Figure 3:
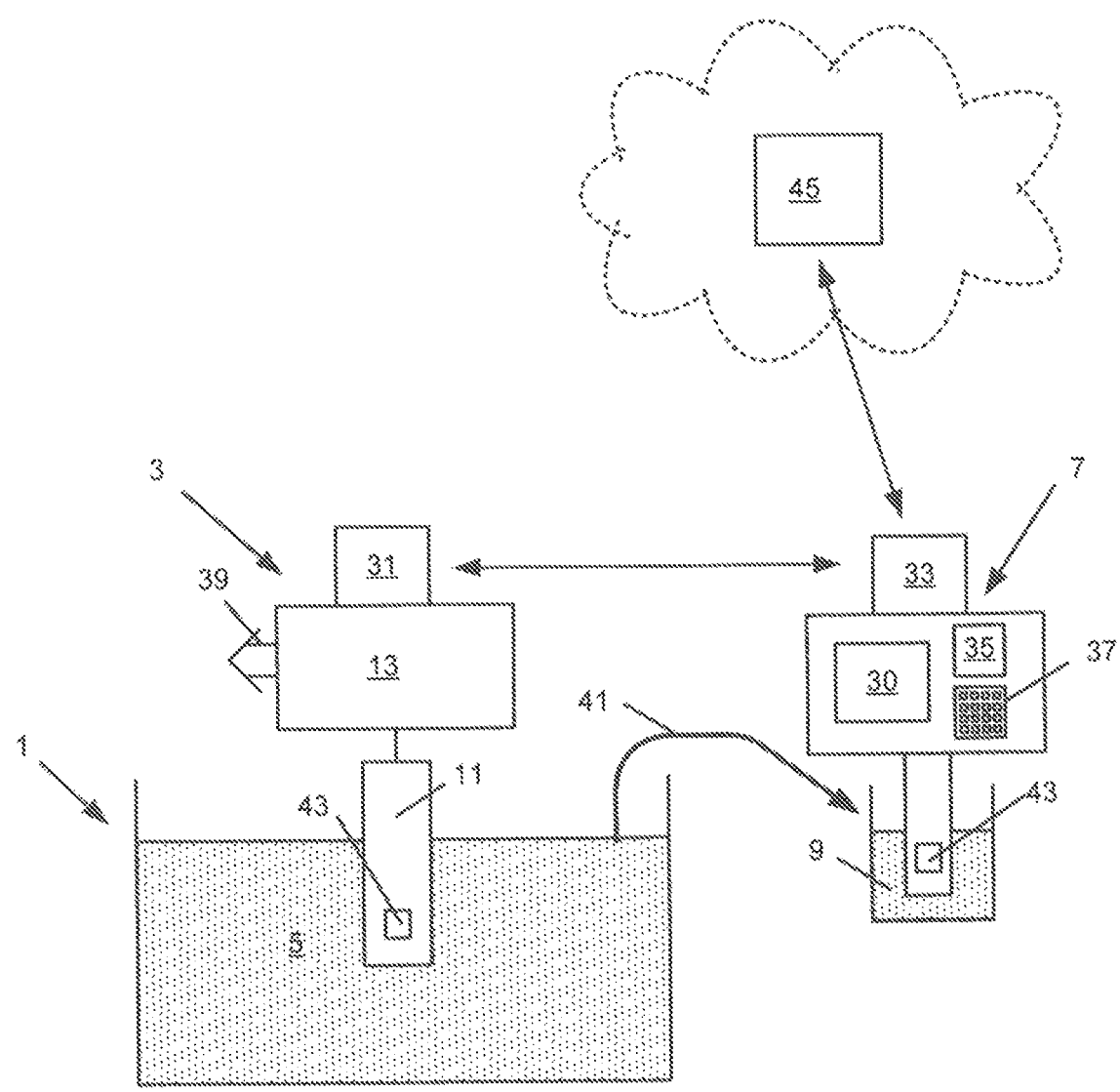
FIG. 3 shows an apparatus according to the present disclosure having a smart device integrated in the reference measuring instrument

According to the present disclosure, the apparatus comprises a smart device 29, 30 which can be temporarily used at the location of use for the purpose of verifying, calibrating and/or adjusting the measuring instrument 1. FIG. 1 shows a smart device 29 designed as a wirelessly communicating smart mobile device as a particularly preferred exemplary embodiment for this purpose. FIG. 3 shows a further example of an apparatus according to the present disclosure which differs from the apparatus shown in FIG. 1 only in that the smart device 30 provided there takes the form of a smart device 30 integrated in the reference measuring instrument 7 and communicating wirelessly via the reference measuring instrument 7.

For wireless communication between the measuring instrument 3, the reference measuring instrument 7 and the mobile device, or between the measuring instrument 3 and the reference measuring instrument 7 comprising smart device 30, a communication carried out in accordance with a predetermined data transmission standard via a local area network, such as a network normally referred to (in English) as a "wireless local area network" (WLAN), a communication via a global network, such as a mobile radio network, and/or a communication via Bluetooth are suitable options. Communication via a mobile radio network can be carried out, for example, according to the standard known by the term "Long-Term Evolution (LTE)" or the term "Global System for Mobile Communication (GSM)".

Correspondingly, the measuring instrument 3 has a communication device 31 which is connected thereto or is designed as a component of the measuring instrument 3 and is designed in such a way that it supports at least one form of wireless communication which is also supported by the reference measuring instrument 7 and/or the mobile device. Similarly, the reference measuring instrument 7 also has a communication device 33 which is connected thereto or is designed as a component of the reference measuring instrument 7 and is designed in such a way that it supports at least one form of wireless communication which is also supported by the measuring instrument 3 and/or the mobile device.

On the smart device 29, 30 an application that is executable by means of the device 29, 30 is installed, which application is configured to regulate a data transfer between the measuring instrument 3, the reference measurement instrument 7 and/or the device 29, 30 that is required for executing at least one verification, calibration and/or adjustment run by means of the apparatus according to a method sequence stored in the device 29, 30 and to document the execution of the method sequence and/or a verification, calibration and/or adjustment result determined by the measuring instrument 3 within the context of the execution.

For each measuring operation which is to be carried out or which was carried out according to the method sequence, the required data transfer in each case comprises the transmission to the measuring instrument 3 of the reference value determined by the reference measuring instrument 7. Here the reference value can be immediately wirelessly transmitted with mediation by the application from the reference measuring instrument 7 to the measuring instrument 3. Alternatively, the reference value can be wirelessly transmitted with mediation by the application from the reference measuring instrument 7 to the mobile device and from the mobile device to the measuring instrument 3. In addition, the data transfer can optionally include further data to be transmitted, such as data to be documented by means of the smart unit 29, 30 and in some cases requests, queries, transmission prompts and/or information required for the coordination of the method executable in accordance with the method sequence by means of the apparatus.

In particular a commercially available smart phone or tablet on which the application is installed is suitable as the mobile device. These devices offer the advantage that they are comparatively inexpensive standard devices produced in mass quantities in comparison with the special devices normally used in measuring and control technology for verifying, calibrating and/or adjusting measuring instruments. In addition they offer the advantage that as schematically shown in FIG. 1 they have a user interface with a display 35 and a keypad 37, which user interface is available to the apparatus both for installation of the application and also as a user interface and/or as a display for the apparatus.

If the smart device 30 is integrated in the reference measuring instrument 7, the reference measuring instrument 7 will preferably have a user interface schematically indicated in FIG. 3 by a display 35 and a keypad 37, which can be used as a user interface and/or as a display for the apparatus.

With the apparatus according to the present disclosure, a method for verifying, calibration and/or adjustment of the measuring instrument 3 installed at the measuring point 1 is executable, wherein the portable reference measuring instrument 7 and the smart unit 29, 30 integrated in the reference measuring instrument 7 or formed by the mobile device is brought to the location of use and the application is started. Then, by means of the apparatus at the location of use, at least one method sequence which is predetermined for that particular use of the apparatus or selected by the user by means of the application is carried out in which at least one measuring operation is executed. In each measuring operation, the measured value of the measurement variable of the medium 1 is determined by means of the measuring instrument 3, a sample 9 is taken, the reference value of the measurement variable of the sample 9 is determined by means of the reference measuring instrument 7 and the reference value is transmitted to the measuring instrument 3. In this arrangement, there is a direct assignment of the measured value to the associated reference value via the temporal and spatial proximity of the measured value and the reference value and the regulation of the data carried out by means of the application. In just the same way, there is a direct assignment of the measurement results to the measuring instrument 3 and in this way at least indirectly also to the measuring point 1 or to the location of use.

Then the measuring instrument 3 performs the verification, calibration and/or adjustment of the measuring instrument 3 to be carried out according to the method sequence on the basis of the measurement results. In addition, the execution of the method sequence and/or a verification, calibration and/or adjustment result determined by the measuring instrument 3 within the scope of the execution is documented by means of the smart device 29, 30.

The present disclosure described here in reference to the apparatus and in reference to the method executable therewith offers the advantages already stated at the outset. In addition, the present disclosure offers the advantage that the measured values of the measuring instrument 3 are also available during the verification and/or calibration at the measuring point 1. They can be displayed there as a measured value, for example, via an interface 39 of the measuring instrument 3 and/or can be output as a measurement signal representing the measured value. The measurement signal can be output, for example, via a data bus connected to the interface 39, for example a field bus or an analog signal transmission line connected to the interface 39.

Within the context of the present disclosure, individual components of the apparatus and/or individual method steps executable by means of the apparatus can have different configurations. To this end, some examples of optional developments that can be used either individually or in combination with each other are described below.

The application can thus, for example, optionally be configured to call up data, such as information relating to the user, to the location of use, to the measuring point 1, to the method sequence to be executed and/or to the verification, calibration and/or adjustment to be carried out by means of the apparatus, to the measuring instrument 3 and/or to the reference measuring instrument 7, and preferably also to document said data. For this purpose, corresponding queries can be directed by means of the application to the measuring instrument 3, the reference measuring instrument 7 and/or the user of the apparatus.

Alternatively or additionally, the measuring instrument 3 can optionally be configured to provide—automatically or in response to a query directed from the smart unit 29, 30 to the measuring instrument 3 that is initiated by the application or the user—the smart device 29, 30 with data stored in the measuring instrument 3, such as its measuring instrument identifier, its measuring instrument type, its age, its operating time and/or a measuring point designation of the measuring point 1.

Alternatively or additionally thereto, the reference measuring instrument 7 can optionally be configured to provide—automatically or in response to a query directed from the smart unit 29, 30 to the reference measuring instrument 7 that is initiated by the application or the user—the smart unit 29, 30 with data stored in the reference measuring instrument 7, such as its measuring instrument identifier, its measuring instrument type, its measuring accuracy, a point in time of a last executed verification, calibration and/or adjustment of the reference measuring instrument 7, its age and/or its operating time.

The data made available by the measuring instrument 3, by the reference measuring instrument 7 and/or by the user can be acquired and documented accordingly as data to be documented by the smart unit 29, 30 by means of the application and/or can be used for the selection of one of a plurality of method sequences stored in the smart unit 29, 30.

Alternatively or additionally, the application can be configured to offer the user a plurality of method sequences stored in the smart unit 29, 30 for selection, from which the user then selects the method sequence(s) to be executed by means of the apparatus. These method sequences may comprise, for example, a method sequence for performing a verification, a method sequence for performing a calibration and/or a method sequence for performing a calibration with subsequent adjustment.

Alternatively or additionally, the stored method sequences may comprise at least one method sequence which includes at least one sub-sequence, the execution of which is linked to a condition to be fulfilled by the result of a sub-sequence preceding this sub-sequence. An example of this is a method sequence, according to which a verification is carried out, followed only by a calibration or a calibration with subsequent adjustment should the verification lead to a negative verification result. A further example of this is a method sequence, according to which a check is made, on the basis of a verification and/or calibration carried out by means of the apparatus, as to whether an adjustment is required. Such a method sequence may provide, for example, that a required adjustment be carried out only if and/or once the user actively agrees to execution via the smart device 29, 30 and/or the associated change of at least one calibration value to be effected by the adjustment exceeds at least one predetermined quantity. Alternatively or additionally, it may be provided that the execution takes place only at a later point in time and/or at a point in time predeterminable by the user via the smart device 29, 30.

The sampling and its transference to the reference measuring instrument 7 may be performed manually by the user of the apparatus, for example, by means of a sampling device 41 of the apparatus which is represented only schematically in FIG. 1 by an arrow. In this case, the smart device 29, 30 is designed in such a way that the user is prompted to take and transfer the sample 9, and/or is designed in such a way that the user can confirm the transfer carried out or the measurement readiness of the reference measuring instrument 7 achieved thereby relative to the smart device 29, 30.

Alternatively, the sampling device 41 can be designed to perform the sampling and/or the transfer thereof in each case in a partially or fully automated operation triggered by the application or the user. For this purpose, the sampling device 41 can take the form of, for example, a separate apparatus or alternatively a component of the reference measuring instrument 7.

Alternatively or additionally thereto, the smart device 29, 30 may optionally be configured to determine at least one additional information item, such as its geographic position, determinable in the form of GPS coordinates, and/or a time of day. This additional information can also be used, for example, to select one of a plurality of method sequences stored in the smart device 29, 30 to perform at least one method sequence and/or as data to be documented by means of the smart device 29, 30. In this arrangement, an identification of the location of use and/or the measuring point 1 can be carried out based on the geographic position of the smart device 29, 30, which identification is then documented accordingly by means of the application, and or on the basis thereof a method sequence stored in the smart device 29, 30 for this measuring point 1 is selected. Alternatively or additionally thereto, at least one sub-sequence of at least one method sequence that is to be executed with mediation by the application by means of the apparatus can be coordinated with the aid of the time of day. In this arrangement, specific measurement results in several successive measuring operations, each having a time stamp determined based on the time of day can be provided, for example. Alternatively or additionally thereto, an execution point in time or time period of at least one verification, calibration and/or adjustment run carried out by means of the apparatus can be determined and documented accordingly on the basis of the time of day.

Alternatively or additionally thereto, the measuring instrument 3 and the reference measuring instrument 7 can optionally be configured to determine an additional variable, such as the temperature of the medium 5 and the sample 9, that is relevant for the measurement of the measurement variable. In this regard FIGS. 1 and 3 show an example in which the measuring instrument 3 and the reference measuring instrument 7 are each equipped with an additional sensor 43 for the metrological acquisition of the additional variable, such as a temperature sensor for the metrological acquisition of the temperature.

This embodiment offers the advantage that the additional variables of the medium 5 and of the sample 9 can be acquired in at least one, several or every measuring operation and taken into account accordingly by the smart device 29, 30 during the execution of the method sequence and/or by the measuring instrument 3 during the verification and/or the calibration. This increases the safety, reliability and accuracy of verifications, calibrations and/or adjustments carried out by means of the apparatus.

The additional variables can be taken into account, for example, in such a manner that the two additional variables determined during a measuring operation are brought together in the measuring instrument 3 and/or in the smart device 29, 30, their difference being determined, and an error to be expected during the verification, calibration and/or adjustment of faults being estimated and output, displayed to the user and/or otherwise documented. Alternatively or additionally thereto, an error message may be output if the difference exceeds a predetermined limit value. Alternatively or additionally thereto, in the event that such a limit is exceeded with mediation by the application, the execution of a further measuring operation can be triggered and carried out, and the method can be continued on the basis of the measurement results of the further measuring operations. As an alternative or additionally thereto, a compensation of a measuring error, depending on the additional variable, of at least one measured value and/or at least one reference value can be carried out and a correspondingly corrected value for verification, calibration and/or adjustment can be used. Alternatively or additionally thereto, a correction of a difference calculated within the context of the verification, calibration and/or adjustment between the measured value and the associated reference value can be determined based on the difference between the two additional variables determined in the measuring operation concerned.

The documentation carried out by means of the smart device 29, 30 can be done in different ways and/or to different extents. In this respect, the documentation can be done in such a way, for example, that—for at least one, several or each verification, calibration and/or adjustment of the measuring instrument 3 of the respective apparatus performed in each case by means of an apparatus according to the present disclosure—data to be documented via the application are acquired and displayed to the user and/or stored in at least one database 45.

For this purpose the smart device 29, 30 may comprise, for example, a local database, not shown separately in FIG. 1 or FIG. 3, in which the data to be documented are storable, are stored or have been stored permanently or at least temporarily. Alternatively or additionally thereto, the apparatus can be configured to store the data to be documented in a central database 45. In this case, the mobile device forming the smart device 29 or the reference measuring instrument 7 comprising the smart device 30 and the central database 45 are preferably designed such that the data to be documented can be transmitted wirelessly from the smart device 29, 30 to the central database 45, in which they then can be stored, are stored or will be stored subsequently. Here the central database 45 can, for example, have an internet connection and the mobile device forming the smart device 29, or the reference measuring instrument 7 comprising the smart device 30 can be configured to communicate with the central database 45 via the internet. A database set up on a single computer, a mainframe or a data processing device with an internet connection can be used as the central database 45. Alternatively, the central database 45 can be a database set up in a cloud. The term "cloud" is understood to mean a cluster of computers which has an internal or external network and a standard IT structure and provides computing power and storage capacity.

Depending on the type and scope of the desired documentation, the data to be documented and/or the data to be documented that are storable and/or are stored in the local and/or in the central database 45 may comprise, for example:

a) information relating to the user, to the location of use, to the measuring point, to the measuring point name and/or to the geographic position of the smart device 29, 30 at the location of use, b) measuring instrument identifier, measuring instrument type, age and/or operating time of the measuring instrument, c) measuring instrument identifier, measuring instrument type, age, operating time, measuring accuracy and/or the point in time of the last performed verification, calibration and/or adjustment of the reference measuring instrument 7, d) an execution point in time or time frame of the verification, calibration and/or adjustment executed, e) the number and/or the measurement results of the measuring operations carried out, f) the determined additional variables and/or an expected error derived therefrom in the verification, calibration and/or adjustment, and/or g) the verification result, the calibration result and/or the adjustment result.

Optionally, the data to be documented is stored in the local and/or central database 45 in such a way that individual data can be specifically called up by the user of the apparatus via the mobile device or the reference measuring instrument 7 comprising the smart device 30 and/or displayed to the user.

Optionally, the smart device 29, 30 and the reference measuring instrument 3 can be used in the manner described above in at least one further location of use as a component of an apparatus according to the present disclosure used there. In this arrangement, data to be documented can also be detected and displayed there and/or stored in the local and/or central database 45 by means of the smart device 29, 30.

The invention claimed is:

1. An apparatus for the verification, calibration and/or adjustment of an in-line measuring instrument for measuring a measurement variable of a medium present at a measuring point at a location of use, comprising:
   the in-line measuring instrument installed at the measuring point; and
   a reference measuring instrument for measuring the measurement variable of a sample of the medium taken at the measuring point,
   wherein the apparatus is configured to perform a measuring operation in which the in-line measuring instrument determines a measured value of the measurement variable and the reference measuring instrument determines a reference value of the measurement variable of the sample, wherein the in-line measuring instrument is designed to communicate wirelessly and is configured to perform a verification, calibration and/or adjustment of the in-line measuring instrument on the basis of the measured value and the reference value both obtained in the measuring operation, and wherein the reference measuring instrument is embodied as a portable, wirelessly communicating reference measuring instrument that is usable at the location of use for the purpose of the verification, calibration and/or adjustment of the in-line measuring instrument, the apparatus further comprises:

a portable smart device usable at the location of use, is integrated in the reference measuring instrument, and communicates wirelessly via the reference measuring device or is formed by a wirelessly communicating smart mobile device, for the purpose of the verification, calibration and/or adjustment of the in-line measuring instrument; and an application that is executable by the smart device and is installed on the smart/device, said application being configured to regulate a data transfer between the in-line measuring instrument, the reference measurement instrument, and/or the smart device that is required for executing the verification, calibration and/or adjustment according to a method sequence stored in the smart device and to document an execution of the method sequence and/or a verification, calibration and/or adjustment result determined by the in-line measuring instrument within the context of the execution.

2. The apparatus according to claim 1, wherein the smart device is a smart phone or tablet, wherein the in-line measuring instrument, the reference measuring instrument, and/or the smart device are configured to communicate wirelessly via a local network, via a global network, via a mobile radio network, and/or via Bluetooth, wherein the in-line measuring instrument includes a communication device which is connected thereto or takes the form of a component of the in-line measuring instrument and is configured to support at least one form of wireless communication that is also supported by the reference measuring instrument and/or by the smart device, and/or wherein the reference measuring instrument includes a communication device which is connected thereto or takes the form of a component of the reference measuring instrument and is configured to support at least one form of wireless communication which is also supported by the in-line measuring instrument and/or the smart device.

3. The apparatus according to claim 1, wherein the data transfer for the measuring operation includes the transmission of the reference value from reference measuring instrument to the in-line measuring instrument.

4. The apparatus of claim 3, wherein the measuring operation further includes the transmission of data to be documented by the smart device and/or requests, queries, transmission prompts, and/or information required for at least one method flow for the coordination of a method that is executable according to the respective method sequence by the apparatus.

5. The apparatus according to claim 1, wherein the application is designed to call up and/or document information relating to a user of the apparatus, to the location of use, to the measuring point, to the method sequence to be executed and/or comprehensive data relating to the verification, calibration and/or adjustment to be carried out by the apparatus, to the in-line measuring instrument, and/or to the reference measuring instrument, wherein the in-line measuring instrument is designed to provide automatically or in a response to a request initiated by the application or the user the smart device with in-line measuring instrument data stored in the measuring instrument including: a measuring instrument identifier, a measuring instrument type, an age, an operating time, and/or a measuring point description of the measuring point, and/or wherein the reference measuring instrument is designed to provide automatically or in a response to a request initiated by the application or the user the smart device with reference measuring instrument data stored in the reference measuring instrument including: a reference measuring instrument identifier, a reference measuring instrument type, a reference measuring accuracy, a point in time of a last executed verification, a calibration, and/or an adjustment of the reference measuring instrument, an age, and/or an operating time.

6. The apparatus according to claim 5, wherein the smart device is designed to determine at least one additional information item and/or is designed to use and/or to document data provided by the user, by the in-line measuring instrument and/or by the reference measuring instrument and/or the additional information for selecting and/or for carrying out at least one method sequence stored in the smart device.

7. The apparatus according to claim 1, wherein the smart device is designed to determine its geographic location at the location of use as an additional variable and to use and/or document the geographic location for the selection of a method sequence stored in the smart device and/or for the identification of the location of use and/or the measuring point.

8. The apparatus according to claim 1, wherein the smart device is designed to determine a time of day, and the application is configured: to coordinate at least one subsequence of at least one method sequence based on the time of day that is executable with mediation by the application by means of the apparatus; to provide specific measurement results in several successive measuring operations, each having a time stamp derived from the time of day; and/or to document an execution point in time or time frame of at least one executed verification, calibration and/or adjustment run based on the time of day.

9. The apparatus according to claim 1, wherein the in-line measuring instrument includes a sensor for measuring an additional variable of the medium and the reference measuring instrument includes a sensor for measuring the additional variable of the sample, wherein the apparatus is configured such that the additional variable of the medium and of the sample are detected in at least one measuring operation or in each measuring operation, and wherein the smart device is designed in such that:

a) the additional variable is taken into account by the smart device when the method sequence is executed;

b) the additional variable from the in-line measuring instrument is taken into account in the verification and/or calibration;
c) on the basis of the additional variable, a compensation of a measuring error, depending on the additional variable, of at least one measured value, and/or at least one reference value is carried out and a correspondingly corrected value is used for verification, calibration and/or adjustment; and/or
d) the difference between the additional variable of the medium and the sample of at least one measuring operation is determined, and based on this difference,
  d1) an error to be expected in the execution of the verification, calibration and/or adjustment is estimated and output, displayed to the user and/or otherwise documented,
  d2) an error message is output if the difference exceeds a predetermined limit value,
  d3) the execution of at least one further measuring operation is triggered by the application when the difference exceeds a predetermined limit value, and the method is continued on the basis of the measurement results of the further measuring operations, and/or
  d4) a correction of a difference between the measured value and the associated reference value within the context of the verification, calibration and/or adjustment is calculated on the basis of the difference between the additional variable of the medium and the sample of at least one measuring operation.

10. The apparatus according to claim 1, wherein the in-line measuring instrument and the reference measuring instrument each include a temperature sensor for measuring the additional variable of temperature.

11. The apparatus according to claim 1,
wherein the stored method sequences include a method sequence which includes a second sub-sequence, the execution of the second sub-sequence is linked to a condition to be fulfilled by a result of a first sub-sequence preceding the second sub-sequence,
wherein the stored method sequences include a method sequence, according to which a verification is carried out, followed only by a calibration or a calibration with subsequent adjustment if the verification leads to a negative verification result, and/or
wherein the stored method sequences include a method sequence according to which a check is made based on a verification and/or calibration performed by the apparatus as to whether an adjustment is required and the apparatus is designed to then execute a required adjustment only if and/or once the user actively agrees to the execution via the smart device and/or the associated change of at least one calibration value to be effected by the adjustment exceeds a predetermined limit, and/or the apparatus is designed to carry out a required adjustment at a later point in time and/or at a point in time predeterminable by the user via the smart device.

12. The apparatus according to claim 1, wherein the smart device is designed to record, and indicate to the user, data to be documented via the application for the verification, calibration and/or adjustment executed by the apparatus and/or to store the data in a database provided in the smart device and/or via the internet in a central database or in a database created in a cloud with internet connectivity.

13. The apparatus according to claim 1,
wherein the smart device is designed to record and display data to be documented via the application for the verification, calibration, and/or adjustment and/or to store the data in a local and/or central database, wherein the data to be documented and/or the data storable in the local and/or central database and/or stored data to be documented, in each case comprise:
  information relating to the user, to the location of use, to the measuring point, to the measuring point name and/or to the geographic position of the smart device at the location of use;
  a measuring instrument identifier, a measuring instrument type, an age and/or an operating time of the in-line measuring instrument;
  a measuring instrument identifier, a measuring instrument type, an age, an operating time, a measuring accuracy and/or a point in time of the last performed verification, calibration and/or adjustment of the reference measuring instrument;
  an execution point in time or time frame of the executed verification, calibration and/or adjustment;
  the number and/or the measurement results of the measuring operations carried out;
  a determined additional variable of the medium and the sample and/or an expected error in verification, calibration and/or adjustment derived therefrom; and/or
  the verification result, the calibration result and/or the adjustment result, and/or
the data are storable or stored in the local and/or central database in such a way, that individual data can be called up by the user in a targeted manner via the smart device.

14. A method for the verification, calibration, and/or adjustment of an in-line measuring instrument installed at a measuring point at a location of use, comprising:
providing a portable reference measuring instrument and a smart device, wherein the smart device is a mobile device or is integrated in the reference measuring instrument;
bringing to the location of use the reference measuring instrument and the smart device;
performing a measuring operation including the in-line measuring instrument determining a measured value of a medium, taking a sample of the medium at the measuring point, the reference measuring instrument determining a reference value of the sample and transmitting the reference value to the in-line measuring instrument;
performing by the in-line measuring instrument the verification, calibration and/or adjustment of the in-line measuring instrument to be carried out according to a method sequence on the basis of the measured value and the reference value; and
documenting by the smart device an execution of the method sequence and/or a verification, calibration and/or adjustment result determined by the in-line measuring instrument.

15. The method according to claim 14,
wherein data made available by the in-line measuring instrument, by the reference measuring instrument and/or by a user are acquired and documented by the smart device by the application and/or are used for the selection of one of a plurality of method sequences stored in the smart device,
wherein the application offers the user a plurality of method sequences stored in the smart device for selection, from which the user selects the method sequence(s) to be executed by the apparatus, wherein the measuring point and/or the location of use of the apparatus is identified based on a geographic position of the smart device determined by the smart device at the location of use, and/or wherein during at least one measuring operation by the in-line measuring instrument, an additional variable of the medium and, by the reference measuring instrument, the additional variable of the sample is determined, and the additional variable of the medium and the sample is used, in that on the basis of their difference, an error to be expected in the execution of the verification, the calibration and/or the adjustment is estimated and output, displayed and/or documented to the user, and/or the execution of at least one further measurement process is triggered if said difference exceeds a predetermined limit value, on the basis of the additional variable determined by the in-line measuring instrument, a compensation of a measurement error of the measured value determined in the measuring operation that depends on the additional variable is carried out and a correspondingly corrected measured value is used for the verification, calibration and/or adjustment, based on the additional variable determined by the reference measuring instrument, a compensation of a measurement error of the particular reference value determined in the respective measuring operation that depends on the additional variable is carried out and a correspondingly corrected reference value is used for the verification, calibration and/or adjustment, and/or based on their difference, a correction of a difference between the measured value and the associated reference value of the measuring operation determined in the context of the verification and/or the calibration is determined.

16. The method according to claim 15, wherein the smart device and/or the reference measuring instrument is/are used in at least one further location of use as a component of an apparatus used there for executing a method for the verification, calibration and/or adjustment of an in-line measuring instrument , and data acquired by the smart device in the method for the verification, calibration and/or adjustment of the in-line measuring instrument at the further location are displayed and/or stored by the smart device in the local and/or central database.

* * * * *